(12) United States Patent
Sudau et al.

(10) Patent No.: US 6,231,472 B1
(45) Date of Patent: May 15, 2001

(54) TORSIONAL VIBRATION DAMPER IN A LOCKUP CLUTCH WITH PLANETARY GEAR SET

(75) Inventors: Jörg Sudau; Erwin Wack, both of Niederwerrn; Christoph Sasse, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/382,501

(22) Filed: Aug. 25, 1999

(30) Foreign Application Priority Data

Aug. 27, 1998 (DE) .............................. 198 38 942
Oct. 8, 1998 (DE) .............................. 198 46 445

(51) Int. Cl.[7] .............................. F16F 15/12; F16H 45/02
(52) U.S. Cl. .......................................... 475/347; 192/3.28
(58) Field of Search ................................ 192/3.28, 3.29, 192/3.3; 475/347

(56) References Cited

U.S. PATENT DOCUMENTS

| | | | |
|---|---|---|---|
| 5,551,928 | * 9/1996 | Sudau | 475/347 |
| 5,733,218 | * 3/1998 | Sudau et al. | 475/347 |
| 5,863,274 | * 1/1999 | Jäckel | 475/347 |
| 6,003,650 | * 12/1999 | Kleifges | 475/347 X |
| 6,019,683 | * 2/2000 | Sudau | 475/347 X |
| 6,058,802 | * 5/2000 | Sudau et al. | 475/347 X |
| 6,099,434 | * 8/2000 | Sasse et al. | 475/347 |

FOREIGN PATENT DOCUMENTS 43 33 562 A1   4/1994  (DE) .
11-159595   *  6/1999  (JP) .

* cited by examiner

Primary Examiner—Rodney H. Bonck
(74) Attorney, Agent, or Firm—Cohen, Pontani, Lieberman & Pavane

(57) ABSTRACT

A torsional vibration damper for a lockup clutch of a hydrodynamic clutch device has a drive-side damper element which is in an operative connection with a turbine shell and a driven-side damper element which is connected with the drive-side damper element via a damping device having at least one energy accumulator acting in the circumferential direction and is in a working connection with a turbine hub. The drive-side damper element is constructed as a planetary carrier for at least one gear unit element of a planetary gear set, while the driven-side damper element acts as another gear unit element of the planetary gear set.

14 Claims, 6 Drawing Sheets

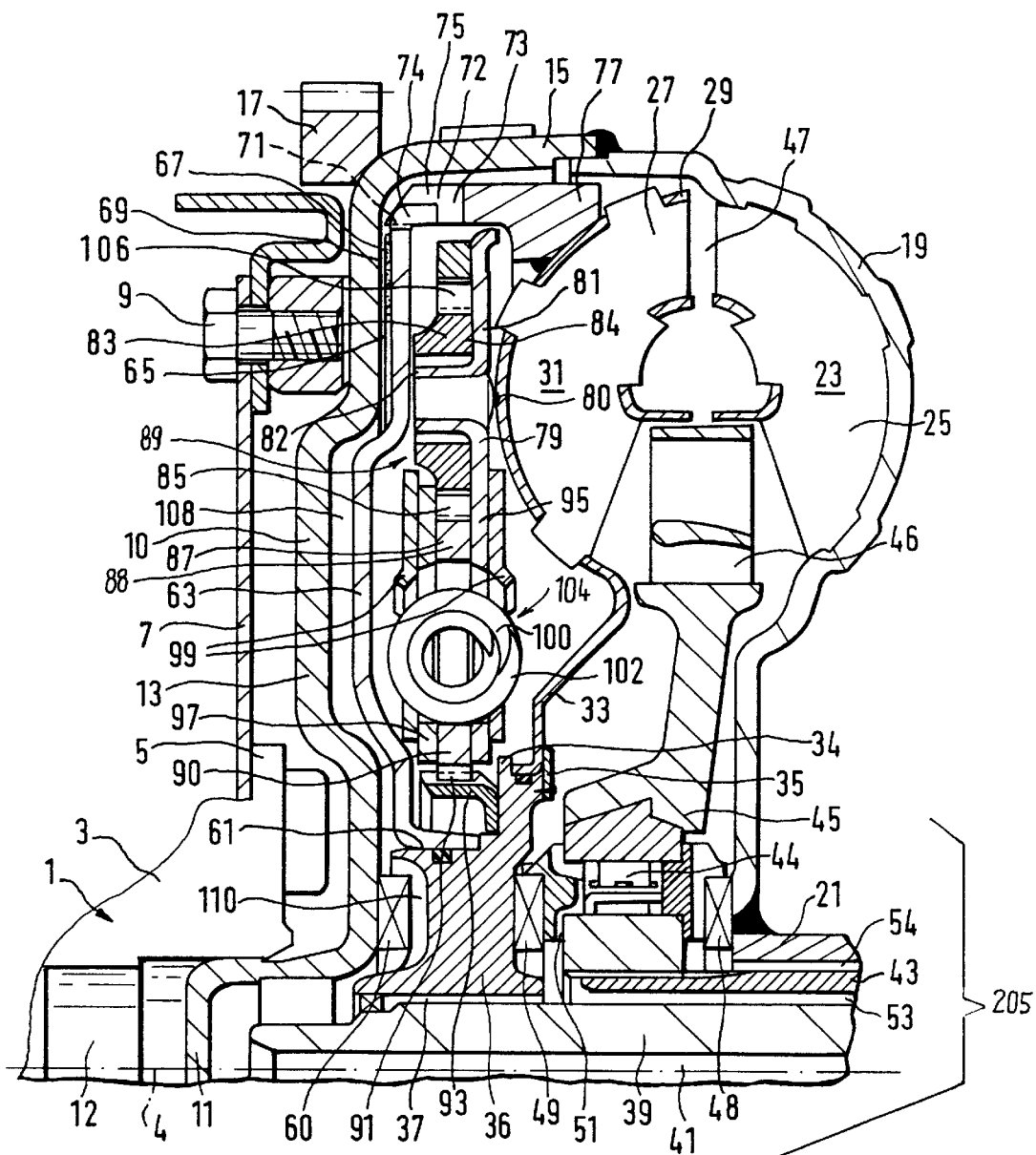
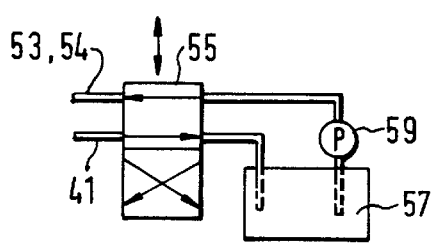
FIG.1

FIG. 6
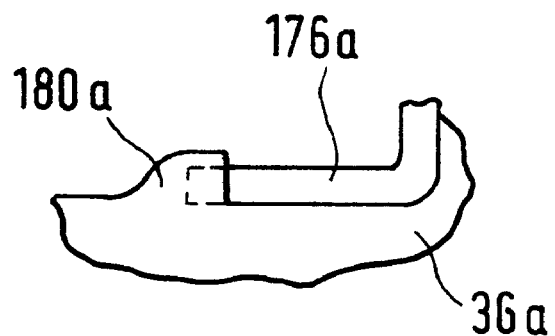
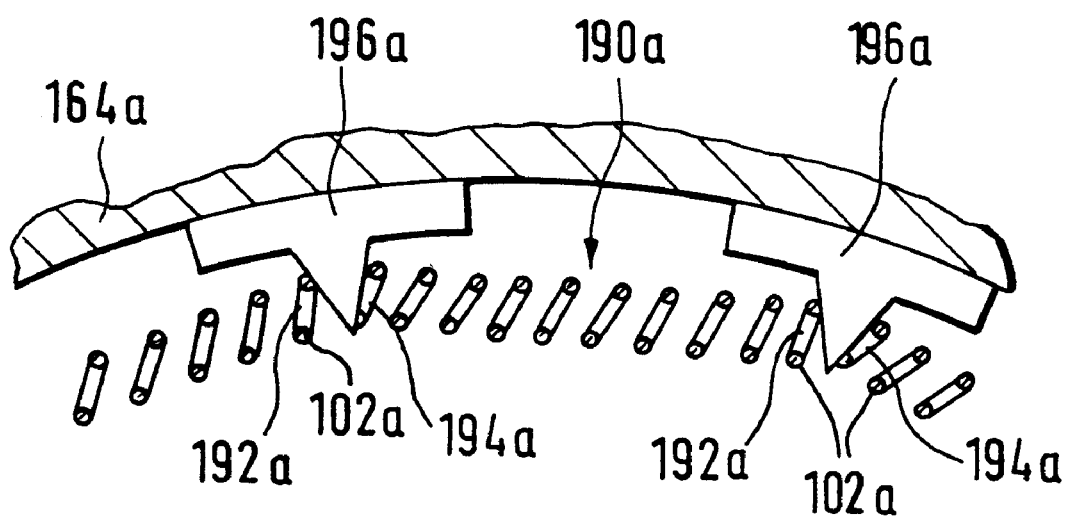
FIG. 7

TORSIONAL VIBRATION DAMPER IN A LOCKUP CLUTCH WITH PLANETARY GEAR SET

BACKGROUND OF THE INVENTION

1. Field of the Invention

The invention is directed to a torsional vibration damper in a lockup clutch of a hydrodynamic clutch device having an impeller wheel and a turbine wheel, wherein the torsional vibration damper is connected between a turbine shell and a turbine hub of the turbine wheel and includes a drive side damper element connected with the turbine shell, a driven side damper element connected to the turbine hub, and a circumferentially acting spring connected between the drive-side and driven-side damper elements.

2. Description of the Related Art

A prior art torsional vibration damper arranged between a turbine shell and a turbine hub of a turbine wheel is known, for example, from German reference DE 43 33 562 A1. This reference discloses a clutch device constructed with an impeller wheel, a turbine wheel having a turbine shell, and a stator wheel and accordingly acts as a hydrodynamic torque converter. The turbine shell is arranged so as to be rotatable relative to a turbine hub and is connected with a drive-side damper element of the torsional vibration damper. The drive-side damper element is operatively connected with a driven-side damper element via a damping device with energy accumulators acting in the circumferential direction. The radial inner side of the driven-side damper element is fixed with respect to rotation relative to the turbine hub so as to be fixed with respect to rotation relative to it.

Considered as a free oscillating system, the drivetrain of a motor vehicle may be roughly reduced to six masses. It is assumed that the drive, including the impeller wheel, is the first mass, the turbine wheel is the second mass, the transmission input shaft is the third mass, the cardan shaft (including the universal joint, i.e., cardan joint) and differential are the fourth mass, the wheels are the fifth mass and the vehicle overall is the sixth mass. In a free oscillating system with n masses (in this case n=six), it is known that n resonant frequencies occur. However, the first resonant frequency relates to the rotation of the entire oscillating system and is not relevant to vibration damping. The rates of rotation or speeds at which the resonant frequencies are excited depend on the number of cylinders of the drive which is constructed as an internal combustion engine.

Because the drive-side damper element of the torsional vibration damper acts on the turbine shell and the driven-side damper element acts on the driven shaft which, as is known, acts as a transmission input shaft, the torsional vibration damper according to the above-cited DE 43 33 562 A1 is commonly known in technical circles as a "turbine damper" and has the following characteristics:

Because the driven-side transmission element is directly connected with the transmission input shaft, the damping device which connects this damper element with the drive-side damper element acts as if it were connected in series with the elasticity of the transmission input shaft, which elasticity is conditional upon torsion. However, since the stiffness of the energy accumulators of the damping device is much less than that of the transmission input shaft, the transmission input shaft is considered very soft with respect to total rigidity. This softness of the transmission input shaft results in excellent decoupling characteristics.

With respect to the resonant frequencies in the drivetrain, the extensive softness of the transmission input shaft causes the third and fourth resonant frequencies of the five resonant frequencies mentioned above to have greater amplitudes compared to a torsional vibration damper arranged in conventional manner between the piston and turbine hub. However, the third resonant frequency occurs at considerably lower speeds, namely at a speed in the order of magnitude of the second resonant frequency. Accordingly, the third resonant frequency has practically no effect when the lockup clutch is closed already at a very low speed, for example, 1200 RPM. However, no influence can be exerted in this way on the fourth resonant frequency, so that noise may occur when passing through the speed range associated with this resonant frequency.

SUMMARY OF THE INVENTION

It is the object of the invention to develop a torsional vibration damper for a lockup clutch of a hydrodynamic torque converter in such a way that as few resonant frequencies as possible, with the smallest possible amplitudes, can develop above the frequency range associated with a very low closing speed of the lockup clutch.

This object is met, according to the invention, through a torsional vibration damper in a combination with a lockup clutch in a hydrodynamic clutch device including an impeller wheel and a turbine wheel having a turbine shell and a turbine hub. The torsional vibration damper comprises a drive-side damper element connectable with the turbine shell of the turbine wheel and rotatable about an axis of rotation, a driven-side damper element connectable with the turbine hub of the turbine wheel and rotatable about the axis of rotation, a damping device comprising at least one energy accumulator arranged circumferentially between the driven-side damper element and the drive-side element such that the drive-side element is rotatable relative to the driven side element against a circumferential force of the energy accumulator, and a planetary gear set comprising a carrier for at least a first gear unit element, the carrier being operatively connected with a first component comprising one of a first damper element and a component connected to the first damper element, and a second gear unit element operatively connected with a second component comprising one of a second damper element and a component connected to the second damper element, wherein the first damper element comprises one of the drive-side damper element and the driven-side damper element and the second damper element comprises the other one of the drive-side element and the driven-side element.

A planetary gear set is used, wherein the drive-side damper element of the torsional vibration damper is constructed as a planetary carrier at which at least one planet gear is rotatably received. The planet gear drives a sun gear which forms the driven-side damper element. In response to the operation of the planetary gear set, in this case especially with respect to the gear unit masses additionally introduced through the gear elements of the planetary gear set, there is generated a mass matrix M given by the following formula:

$$M = \begin{bmatrix} J_t^* + \dfrac{4}{(i+1)^2} \cdot J_p + \dfrac{(i+1)^2}{i^2} \cdot J_h & -\dfrac{4}{(i+1)^2} \cdot J_p + \dfrac{i-1}{i^2} \cdot J_h \\ -\dfrac{4}{(i+1)^2} \cdot J_p + \dfrac{i-1}{i^2} \cdot J_h & J_S + \dfrac{4}{(i+1)^2} \cdot J_p + \dfrac{i-1}{i^2} \cdot J_h \end{bmatrix},$$

where $i = -\dfrac{r_H}{r_S} \quad J_t^* = J_t + m_p \cdot a^2.$

The symbols contained in the formula indicated above are defined as follows:

$J_t$ mass moment of inertia of planetary carrier
$J_s$ mass moment of inertia of sun gear
$J_h$ mass moment of inertia of ring gear
$J_p$ mass moment of inertia of planet gear
$m_p$ mass of planet gear
a axial distance (axis of rotation to center axis of planet gear)

The parts of the formula between the brackets at upper left and lower right form the main diagonal of the mass matrix, while the parts at lower left and upper right form the secondary diagonal of the mass matrix. The main diagonal indicates the resonant frequency of the torsional vibration damper by the mass moments of inertia and transmission ratios indicated therein. Of course, the stiffness given by the energy accumulator is also indicated, wherein the stiffness matrix is given as:

$$c = c' \begin{bmatrix} 1 & -1 \\ -1 & 1 \end{bmatrix},$$

where c' is the spring constant of the energy accumulator.

The secondary diagonal of the mass matrix gives the "negative resonant frequency" of the torsional vibration damper, the optimum decoupling frequency, a frequency at which a minimum is achieved in the amplitude-frequency response. Also, the secondary diagonal is dependent on mass moments of inertia of the planetary gear set, on the gear ratio between the drive-side damper element and the driven-side damper element, as well as on the stiffness of the energy accumulator.

Accordingly, in contrast to gearless torsional vibration dampers in which the secondary diagonal is zero, the secondary diagonal in the torsional vibration damper according to the invention is occupied and manifests itself in the formation of the above-mentioned decoupling frequency. Since both the mass matrix and the stiffness matrix given by the energy accumulator have decisive importance in a torsional vibration damper with a planetary gear set, suitable adaptation of the mass moments of inertia to the elements of the planetary gear set and energy accumulators makes it possible to configure the decoupling frequency in such a way that it falls within the frequency range of the most troublesome resonant frequency, that is, the third resonant frequency of the drivetrain. Ideally, this leads to the elimination of this resonant frequency, but at least results in a substantial reduction in its amplitude.

As a result of the additional masses introduced by the planetary gear set, the resonant frequency of the torsional vibration damper according to the invention is in a speed range of the drive lying considerably below the idling speed of the drive, e.g., of an internal combustion engine. A positive secondary effect of the planetary gear set is the greater dynamic mass moment of inertia of the turbine shell resulting from the effect of the mass moments of inertia of the gear elements, e.g., the planet gear and ring gear, which are multiplied by way of the gears and given during acceleration. Accordingly, an apparently higher mass moment of inertia occurs at the torsional vibration damper which hinders the development of torsional vibrations by reacting on the crankshaft of the drive. This results in lower torque fluctuations at the engine front. This has the advantageous result that auxiliary or added units driven by the crankshaft are particularly protected.

When a torsional vibration is introduced in a planetary gear set with a planetary carrier that is a drive-side damper element and is in an operative connection with at least one gear element of the planetary gear set, the moment associated with the torsional vibration is divided by the planetary gear set, wherein a first partial moment is transmitted to the drive-side damper element and a second partial torque is transmitted to an intermediate mass formed by the at least one gear element of the planetary gear set. With respect to magnitude and working direction, this partial moment depends on the construction of the planetary gear set, on the connection between the latter and the damper elements, and on the arrangement of the damping device. It is quite possible for each of these partial moments to be greater than the introduced torque. Because of the deformation of the energy accumulators of the damping device with different deflection angles due to the arrangement, according to the invention, of the damping device between two respective masses (damper element or intermediate mass), the two partial moments act in opposition to one another in such a way that although the delivered torque is still in the order of magnitude of the introduced torque in terms of amount, it can be transmitted to the subsequent transmission input shaft with a noticeably smoothed torque curve due to the decoupling function of the energy accumulator.

In an alternative embodiment form of the torsional vibration damper according to the invention, the drive-side damper element and/or a component that is substantially fixedly connected therewith is at least partially arranged radially inside of the at least one gear unit element and forms a sun gear of the planetary gear set. The advantages with respect to vibration behavior which were described above also apply to this arrangement.

Further, in the torsional vibration damper according to the invention, the damping device comprises at least one damper spring arrangement which extends substantially in the circumferential direction. The circumferential end areas of the at least one damper spring arrangement abut the drive-side damper element and the driven-side damper element and the at least one damper spring arrangement lies in a radial outer area of the clutch device. In particular, the relocation of the damping device toward the radial outer side results in the advantage that the spring volume can be increased, resulting in a softer spring characteristic. It is noted that when the term "spring" is employed herein, this term comprehends any flexible means such as a helical pressure spring or helical tension spring, a block spring of plastic or rubber, or the like.

As a result of the aforementioned shifting of the damping device toward the radial outside and the possibility of increasing the spring volume, the at least one damper spring arrangement may comprise at least two damper springs which are supported against one another in their end areas facing one another by a supporting member which is displaceable in the circumferential direction with respect to the drive-side damper element and driven-side damper element. The at least two damper springs are supported, or may be supported, in their end areas remote of one another at the drive-side damper element and at the driven-side damper element. Alternatively, the at least two damper springs may supported at another damper spring by another supporting member.

Furthermore, an axial support arrangement may be arranged for the at least one damper spring arrangement, even in the case of very large damper spring arrangements or damper spring arrangements which are very long in the circumferential direction, to prevent the springs from being carried along with the flow of fluid and deflected in the axial direction in an unwanted manner during torsional vibrations and when fluid is displaced from the area of the springs as a result of these torsional vibrations.

In this case, the axial support arrangement may, for example, comprise the turbine shell and/or an axial support ring.

Further, the drive-side damper element of the torsional vibration damper may be coupled for common rotation with a housing of the clutch device by the lockup clutch.

To provide the greatest possible coupling force, the lockup clutch may comprise a multi-plate clutch arrangement. Further, it is advantageous when the lockup clutch is arranged in an area radially inside the damping device.

Because of the fluid forces present in the torque converter during its operation, axial forces act on the turbine wheel. To ensure that the turbine wheel is held in its desired axial position, the torsional vibration damper according to the invention preferably may comprise an axial supporting arrangement.

This axial supporting arrangement for the turbine may, for example, comprise the driven-side damper element. In this case, the drive-side damper element may be essentially fixedly connected with the turbine shell and such that the turbine shell and the drive-side damper element are supported axially at the driven-side damper element.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a sectional view showing the top half of a longitudinal section through a lockup clutch with a torsional vibration damper in a hydrodynamic torque converter according to an embodiment of the present invention;

FIG. 6 shows an enlarged view of the area VI circled in FIG. 5; and

FIG. 7 is a schematic axial view along arrow VII in FIG. 5 showing an embodiment of the torsional vibration damper having a plurality of damper springs and sliding blocks located therebetween.

DETAILED DESCRIPTION OF THE PRESENTLY PREFERRED EMBODIMENTS

Figure 2:
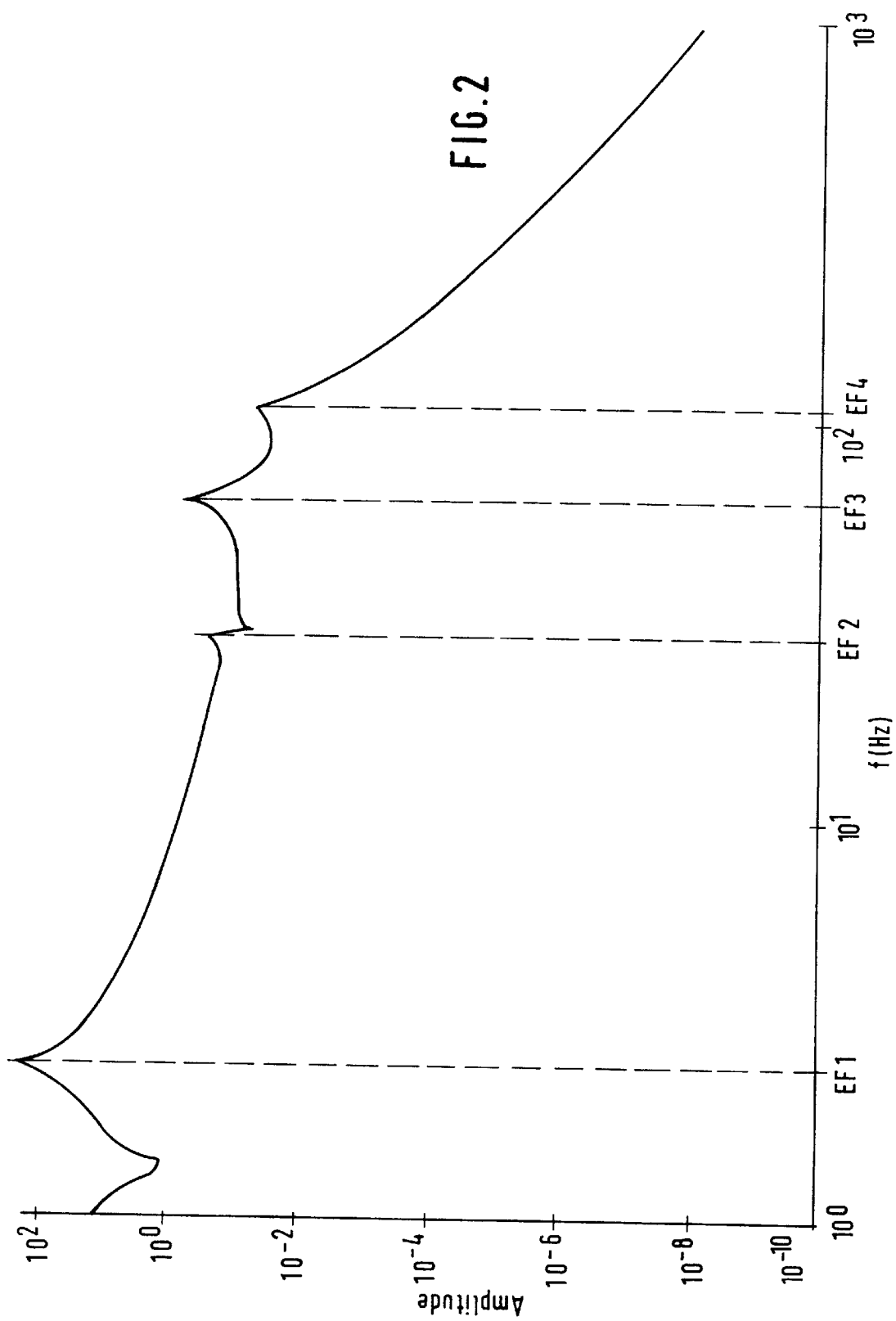
FIG. 2 shows a logarithmic graph of the amplitude-frequency response at the differential of the torque converter in a lockup clutch without a torsional vibration damper.

FIG. 1 shows a hydrodynamic torque converter 205 according to an embodiment of the present invention fastened to a drive 1, e.g., a crankshaft 3 of an internal combustion engine, and is rotatable with the crankshaft 3 about a common axis of rotation 4. The crankshaft 3 has a radial projection 5 which is acted upon by the radial inner end of a flexible plate 7. A radial outer area of the flexible plate 7 is fastened to a converter housing 10 by a screw connection 9. The converter housing 10 is additionally guided relative to the drive 1 by a pin 11 which is formed in a radial inner area of the converter housing and engages a cut out portion of the crankshaft 3.

The converter housing 10 also includes a drive-side radial flange 13 with a radial inner area connected to the pin 11. An outer circumferential area of the drive-side radial flange 13 carries a toothed rim 17 serving for engagement of a starter pinion which is constructed in conventional manner and is therefore not shown. In the circumferential region, the radial flange 13 passes into an axial shoulder 15 of the converter housing 10 to which is fastened to an impeller shell 19. A housing hub 21 is connected to the radial inner area of the impeller shell 19. A vane arrangement 23 on the impeller shell 19 further radially outward from the housing hub 21 forms an impeller wheel 25. Associated with the impeller wheel 25 is a turbine wheel 27 which has a turbine shell 29 for receiving a vane arrangement 31 and is guided via a turbine wheel foot 33 so as to be axially fixed but rotatable on the turbine hub 36. The axial fixing of the turbine wheel foot 33 on the turbine hub 36 is accomplished with a drive-side axial securing means 34 formed integral with the turbine hub 36 as a radial projection and another axial securing means 35 formed by welding a plate to the turbine hub 36.

The turbine hub 36 is operatively connected with a driven shaft 39 via a toothing 37. The driven shaft is conventionally formed by a transmission input shaft and has an inner bore hole 41. The driven shaft 39 is enclosed by a sleeve 43 so as to form a first annular space 53 therebetween, and a second annular space 54 is located radially between this sleeve 43 and the above-mentioned housing hub 21. As depicted at the bottom of FIG. 1, the inner bore hole 41 of the driven shaft 39 and the annular spaces 53, 54 are connected at the outputs of a switching valve 55 connected with a reserve 57 containing converter fluid and a pump 59 for transferring the converter fluid to the annular spaces 53, 54 or the inner bore hole 41.

The sleeve 43 surrounding the driven shaft 39 is connected with an inner ring of a freewheel bearing 44 so as to be fixed with respect to rotation relative to it. The freewheel bearing 44 carries a stator wheel hub 45 of a stator wheel 46 in its circumferential area. Together with the stator wheel 46, the impeller wheel 25 and the turbine wheel 27 form a hydrodynamic converter circuit 47.

The stator wheel 46 is received so as to be axially secured between two axial bearings 48 and 49, one of which is arranged axially between the impeller shell 19 and the freewheel bearing 44 and the other of which is arranged between the freewheel bearing 44 and the turbine hub 36. The other end of the turbine hub 36 is supported via another axial bearing 60 at the drive-side radial flange 13. It should be mentioned that at least the axial bearing 49 has channels 51 for producing a flow connection between the annular spaces 53, 54 and the converter circuit 47.

In a radial outer area, the turbine hub 36 has a supporting surface 61 for a piston 63 of a lockup clutch 65. The radial outer area of the piston 63 has a friction facing 67 which can be brought into operative connection with a friction surface 69 provided at the inner side of the drive-side radial flange 13. The piston 63 comprises recesses 71 in a circumferential area which engage projections 72 of a transmission element 77 provided axially between the radial flange 13 and the turbine wheel 27, without play in the circumferential direction. Conversely, the projections 74 of the piston 63 engage in recesses 73 of the transmission element 77. The aforementioned recesses 71, 73 and projections 72, 74 accordingly serve as rotational driver 75 between the piston 63 and the transmission element 77 which is fastened to the turbine shell 29 by a weld.

A cover plate 79 comprising a pin 82 pressed out toward the piston 63 is fastened to the turbine shell 29 farther inward radially via a weld 80. The pin 82 rotatably receives a planet gear 83 which acts as a gear unit element 84 of a planetary gear set 89. Accordingly, the cover plate 79 acts as a planetary carrier 95 in view of its carrying function for the planet gear 83. The planet gear 83 meshes via a toothed engagement 85 at its radial inner side with a sun gear 87 of the planetary gear set 89. The sun gear 87 is connected via a toothing 91 with a yoke 93 so as to be fixed with respect to rotation relative to it, this yoke 93 being fastened to the turbine hub 36. The cover plate 79, together with additional cover plates 97, 99 which are connected with it so as to be fixed with respect to rotation relative to it, forms a drive-side damper element 81 of a torsional vibration damper 104. The drive-side damper element 81 is connected, via a damping device 100 having energy accumulators 102, e.g., springs, which are deformable in the circumferential direction, with the sun gear 87 which acts as driven-side damper element 88, wherein this sun gear 87 serves as another gear unit element 90 of the planetary gear set 89.

It is additionally noted that a radial outer area of the planet gear 83 engages via a toothing with a ring gear 106 which is supported in a floating manner in the circumferential direction, but may be secured in the axial direction in a manner not shown.

A chamber 108 situated axially between the radial flange 13 and the piston 63 is supplied via a channel 110 in the axial bearing 60 when an overpressure occurs in the inner bore hole 41 of the driven shaft 39. As long as overpressure exists in this chamber 108 relative to the converter circuit 47, the piston 63 is distanced far enough from the radial flange 13 of the converter housing 10 so that the friction facing 67 at the piston 63 is separated from the friction surface 69 at the radial flange 13. Movements of the converter housing 10 are then conducted to the turbine shell 29 via the impeller wheel 25. Since the turbine hub 36 is supported in the circumferential direction relative to the driven shaft 39 and is therefore subject to inertia, the turbine shell 29 executes a relative movement in the circumferential direction relative to the turbine hub 36. In so doing, the cover plate 79 and accordingly the planetary carrier 95 are deflected, and the ring gear 106 on the one hand and sun gear 87 on the other hand are driven by the planet gear 83, wherein the sun gear 87 is acted upon in addition by the planetary carrier 95 via the energy accumulators 102 of the damping device 100. This causes a relative movement in the torsional vibration damper 104 between the planetary carrier 95, as the drive-side damper element 81, and the sun gear 87 as the driven-side damper element 88, whereupon the latter transmits a movement to the turbine hub 36 via the yoke 93.

When an overpressure is produced in the converter circuit 47 relative to the chamber 108, the piston 63 is displaced toward the radial flange 13 of the converter housing 10 and the friction facing 67 is accordingly brought into contact with the friction surface 69.

Movements of the converter housing 10 are then conducted directly to the piston 63 by circumventing the converter circuit 47. Movements of the converter housing 10 travel from the piston 63, via the transmission element 77, to the turbine shell 29, wherein the transmission is carried out proceeding from the latter as has already been described with reference to the opened lockup clutch 65.

Figure 3:
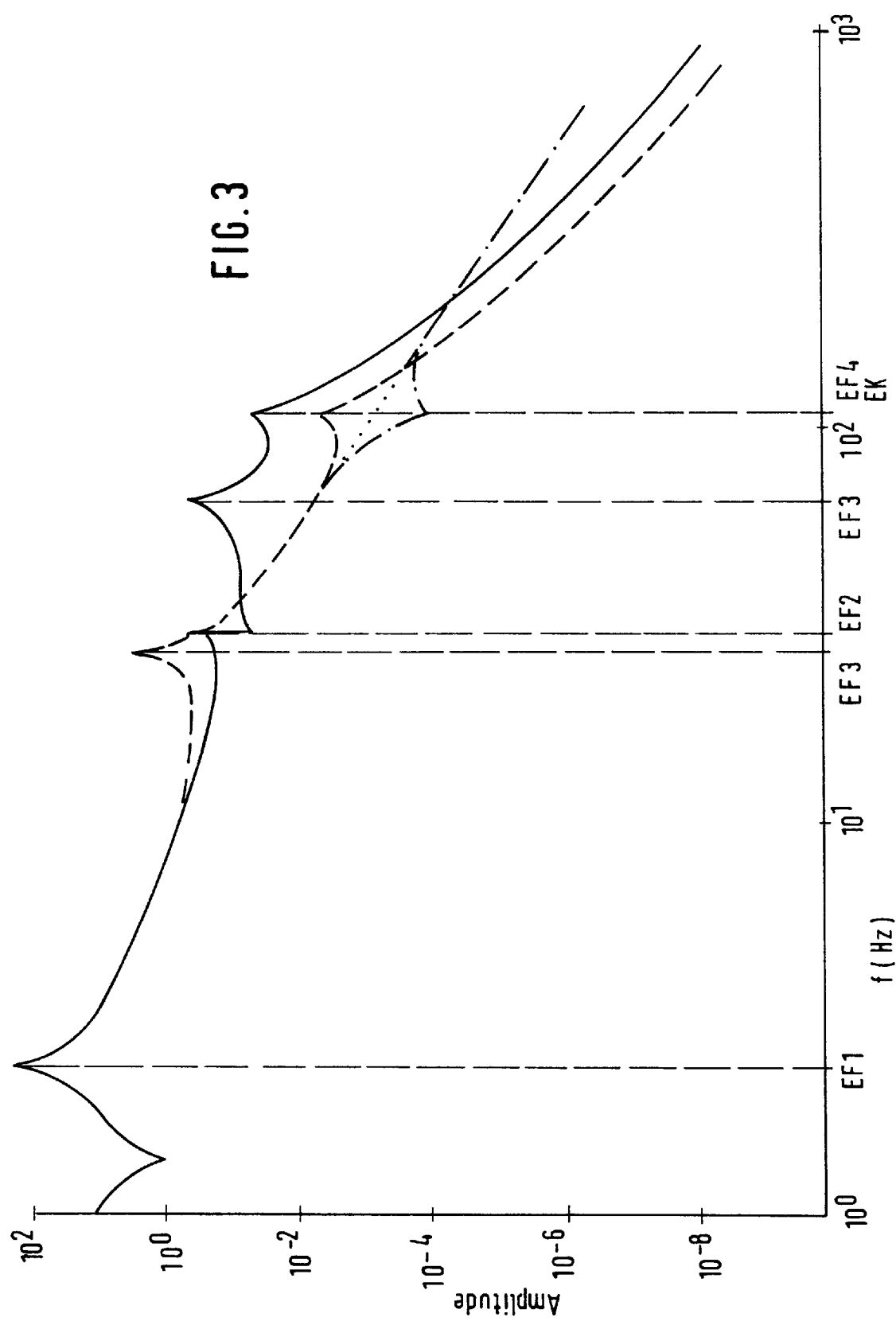
FIG. 3 shows a logarithmic graph corresponding to FIG. 2, but with the use of the torsional vibration damper according to the invention in the lockup clutch.
Figure 4:
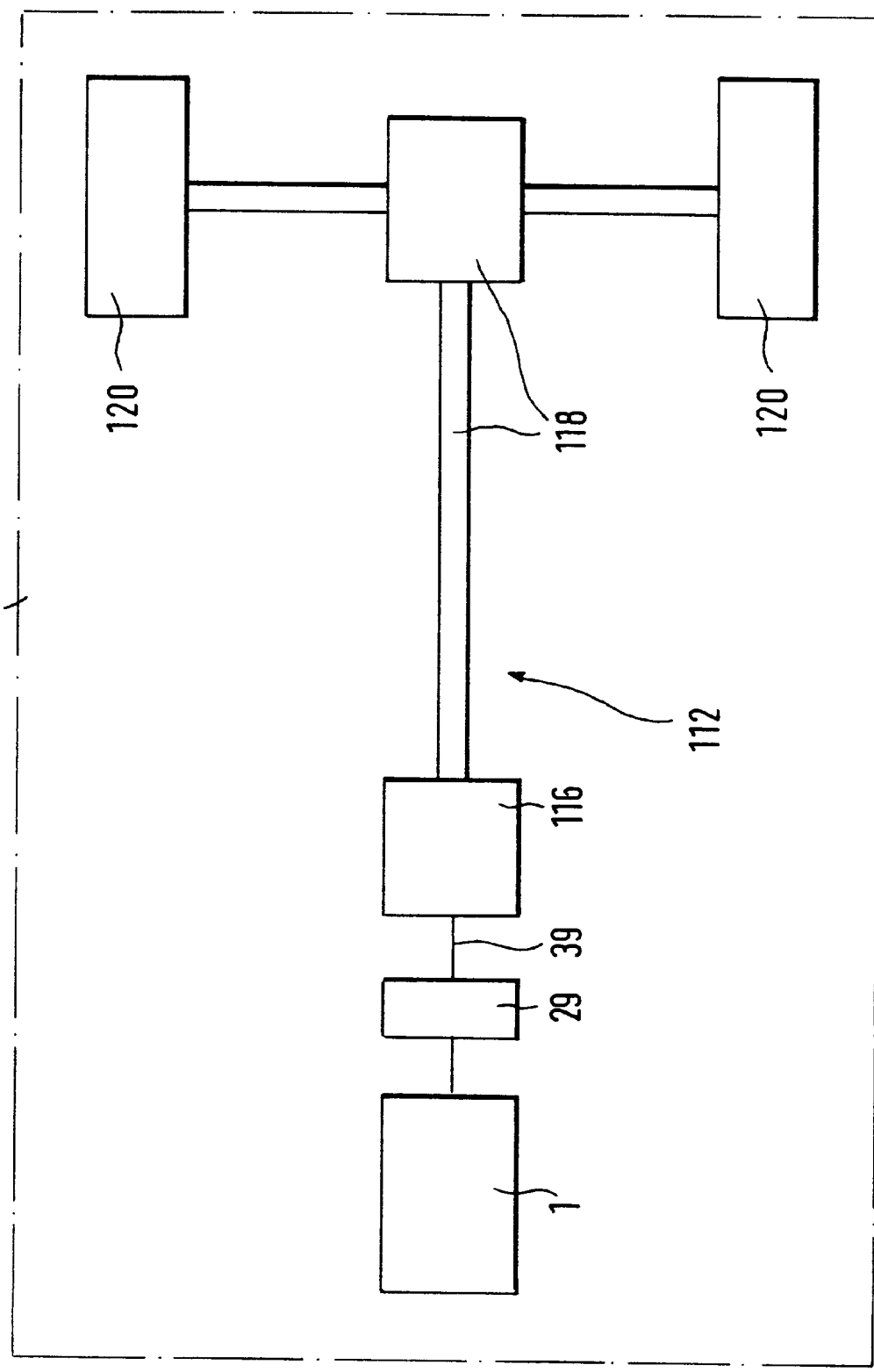
FIG. 4 shows a drivetrain of a motor vehicle including the hydrodynamic torque converter of FIG. 1.

Referring now to FIGS. 2–4, the manner of operation resulting from the design construction of the torsional vibration damper 104 with the planetary gear set 89 will be described.

FIG. 4 shows a motor vehicle 114 with a drivetrain 112 reduced to six essential oscillating components. The first essential oscillating component is the drive 1 in connection with the impeller wheel of the torque converter. The second essential oscillating component is the turbine shell 29 which is connected to the impeller wheel. The transmission input shaft, i.e., the driven shaft 39, of an automatic transmission 116 forms the third essential oscillating component. A universal joint in combination with a differential, both designated by 118, forms the fourth essential oscillating component of the drivetrain 112. The wheels 120 serve as the fifth essential oscillating component, and the motor vehicle 114 in its entirety acts as the sixth essential oscillating component. Based on a drivetrain 112 of this kind, an amplitude-frequency response, e.g., for the turbine shell, results in the manner presented in FIG. 2 when a lockup clutch without a torsional vibration damper is used, so that torsional vibrations delivered from the drive 1 are conducted without filtering to the driven shaft 39. The amplitude curve of the oscillating system, the drivetrain 112 being considered as such, is shown over the frequency response. This is shown logarithmically with respect to amplitude as well as frequency. As was already explained above, in a drivetrain 112 which is reduced to the masses consisting of drive and impeller wheel, turbine shell, transmission input, universal and differential, wheels, and vehicle, the sixth resonant frequency relates to the entire vehicle and is not relevant to vibration damping. Accordingly, there are five resonant frequencies EF, of which the four essential resonant frequencies are designated by EF1 to EF4 in FIG. 2. The fifth resonant frequency is not shown and is not significant as regards the present invention.

With respect to its amplitude, the strongest resonant frequency EF1 shown in the graph is below 10 Hz at very low frequencies. The second resonant frequency EF2 occurs at a considerably higher frequency, in the order of magnitude of roughly 30 Hz, but with a considerably reduced amplitude compared with EF1. EF3 and EF4 follow at still higher frequencies above 50 Hz.

In the interest of reduced energy consumption, the lockup clutch in a modern hydrodynamic torque converter is controlled at a very low closing frequency $f_s$ to bring the piston 63 into the axial position in which the friction facing 67 contacts the friction surface 69 of the converter housing 10 and torques are conducted directly to the driven shaft 39 by circumventing the converter circuit 47. More specifically, it is endeavored to close the lockup clutch 65 already at 1200 RPM which, based on the second order of excitation which is especially critical in internal combustion engines with four cylinders, corresponds to a frequency of 40 Hz. Consequently, EF1 and EF2 lie below this closing frequency $f_s$ and do not lead to troublesome noises in the drivetrain 112 because the torsional vibration damper 104 is blocked during operation of the converter due to the higher loading torque occurring in connection with the torque conversion. In contrast, EF3 and EF4 lie above the closing frequency $f_s$ and, especially as concerns EF3, result in troublesome noises.

With respect to this problem, reference is had to the amplitude-frequency response shown in FIG. 3, which can be achieved by the torsional vibration damper 104 according to the invention. The occupying of the secondary diagonal of the mass matrix as a result of the planetary gear set 89 and the arrangement of the energy accumulators 102 generate an amplitude-frequency response which is indicated by dash-dot lines in FIG. 3 in the frequency range of EF3 and EF4 and has a determined decoupling frequency Ek at which a minimum amplitude occurs. By suitably adapting the masses of the planetary gear set 89 and energy accumulator 102, which masses take part in the gear multiplication, this decoupling frequency Ek is brought as close as possible to the resonant frequency EF4 of the amplitude-frequency response shown in dashed lines in FIG. 3 in the frequency range of EF3 and EF4 and ideally coincides with EF4. The superposition of the dashed line with amplitude EF4 and the dash-dot line with the decoupling frequency Ek gives the dotted middle line at which no amplitude EF4 is present. Accordingly, no noise problems occur at this point when the lockup clutch 65 is closed, i.e., engaged.

Due to the arrangement of the energy accumulators in front of the driven shaft 39, the amplitude EF3 is shifted into the range below the closing frequency fs and accordingly causes no noise problems.

Figure 5:
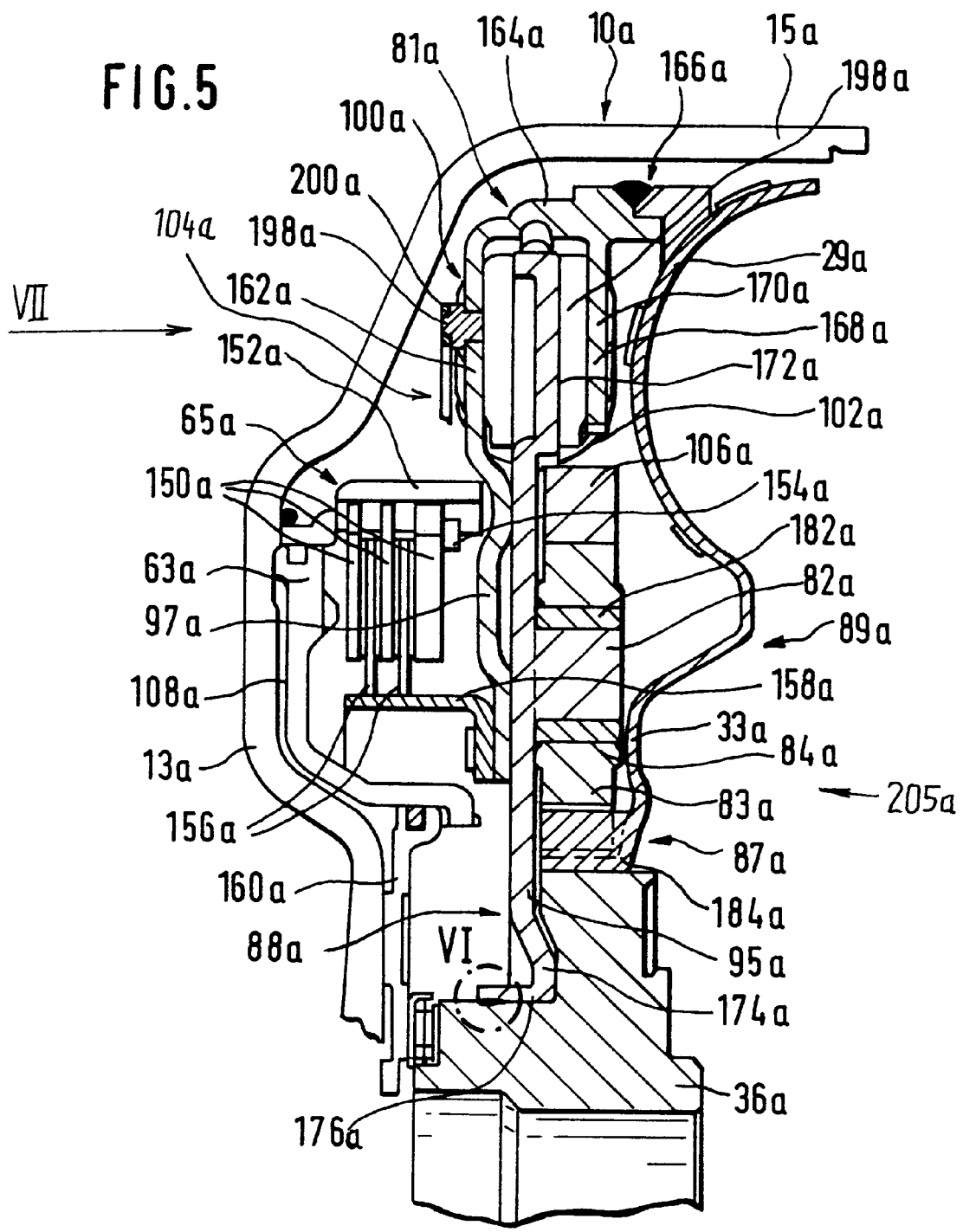
FIG. 5 is a partial sectional view showing a top half of a longitudinal section through a lockup clutch with a torsional vibration damper in hydrodynamic torque converter according to another embodiment of the present invention.

FIGS. 5–7 show another embodiment of a torsional vibration damper 104a in a hydrodynamic torque converter 205a according to the invention. Components corresponding to the components described above with respect to construction and operation are designated by the same reference numbers with the addition of an "a". The following description relates essentially to the differences in construction. In this connection, only those parts of a torque converter which have a different construction are shown in FIG. 5.

In the embodiment shown in FIG. 5, the lockup clutch 65a is constructed as a multi-plate clutch. A plate carrier 152a which carries a plurality of outer plates 150a so as to be axially movable but fixed with respect to rotation is fixed to the converter housing 10a by welding or the like. An axial stop 154a is provided at the carrier 152a and limits the movement of the outer plates 150a toward the right in FIG. 5—away from radial flange 13a relative to the carrier 152a. Inner plates 156a are connected so that they are fixed with respect to rotation with an inner plate carrier 158a but are axially movably engaged between the individual outer plates 150a.

A piston 63a is guided in a sealed manner with respect to the plate carrier 152a. Furthermore, a radially inner side of the piston 63a is guided so as to be sealed with respect to a supporting element 160a which is preferably fixedly connected with the housing 10a. As was described above in the embodiment of FIG. 1, a space 108a formed between the piston 63a and the housing 10a communicates with a central opening of a driven shaft—i.e., transmission input shaft—to enable the exchange of fluid. Accordingly, depending on the increase in fluid pressure in the space 108a, the piston 63a may be moved toward the right with reference to the view in FIG. 5—i.e., away from the housing 10a—against the pressure prevailing in the interior of the torque converter and thereby pressing against the outer plate 150a lying closest to it. The axial stop 154a holds the outer plates 150a so that a clamping force is occurs generating a rotational coupling between the outer plates 150a and the inner plates 156a. Friction facings or the like can also be provided in this area, i.e., in the area of the plates.

The inner plate carrier 158a is connected with a cover plate 97a by a fixed connection such as a riveting or welding. The cover plate 97a extends radially outward from this connection area and forms control edges 162a for the energy accumulators 102a, i.e., springs of the damping device 100a. Furthermore, the cover plate 97a comprises an axial area 164a extending axially outward past the springs 102a and fixedly connected at a connection point 166a with the turbine shell 29a, for example, by laser welding. Accordingly, the turbine shell 29a may be regarded this case either as a component connected with the drive-side damper element 81a of the torsional vibration damper 104a or as a portion of the drive-side damper element 81a. Another cover plate portion 168a extends radially inward from the cover plate 97a or from the axial area 164a and also forms control edges 170a for the springs 102a.

A hub disk in the form of a planetary carrier 95a engages axially between the two cover plates 97a, 168a and likewise forms control edges 172a for the springs 102a. Accordingly, the cover plates or cover plate portions 168a, 97a and the hub disk 95a or planetary carrier 95a form the torsional vibration damper 104a in which the two cover plates 97a, 198a form a drive-side damper element 81a and the planetary carrier 95a forms a driven-side damper element 88a. For this purpose, the radial inner area of the planetary carrier 95a is connected with the turbine hub 36a axially and is also fixed with respect to rotation relative to it. As is shown in the enlarged view in FIG. 6, a foot region 174a of the planetary carrier 95a may be bent at an angle and may also be supported at that location axially as well as radially on the turbine hub 36a.

To achieve the coupling against relative rotation, the foot region 174a may, for example, have a profile which is not symmetric with respect to rotation, e.g., in polygonal shape, in the area of its inner circumferential opening. Alternatively or in addition, the foot region 174a may be fixed in its essentially axially extending annular area 176a by caulking, i.e., a shaping of material, in the area of the turbine hub 36a as is shown in FIG. 6. In this respect, it is advantageous when the foot region 174 comprises a toothing in this annular area 176a in which material areas 180a of the turbine hub 36a which are displaced by the shaping engage or may be pressed in. Joining by a fixed connection such as welding is also possible in this case.

The planetary carrier 95a carries planet gears 83a via respective shoulders or stamped out portions or pins 82a. A bearing sleeve 182a, e.g., made of brass, may optionally be inserted intermediate the pin 82a and the planet gear 83a. The planet gears 83 are in meshed engagement on the radial outside with a ring gear 106a which is freely rotatable—supported in a floating manner—and are in meshed engagement on the radial inner side with a toothing 184a which is formed at the foot 33a of the turbine shell 29a. In this embodiment, the sun gear 87a is formed by the foot 33a. It is noted that the foot 33a of the turbine shell 29a is not fixed to the turbine hub 36a in the area of the toothing 184a, but rather is mounted on the turbine hub 36a so as to be rotatable relative thereto.

When torsional vibrations leading to a relative rotation between the planetary carrier 95a and the cover plates 97a, 168a occur during rotating operation resulting in a compression of the springs 102a between the individual control edges 162a, 170a and 172a, this also leads to a relative rotation between the turbine shell 29a and the planetary carrier 95a because the turbine shell 29a is fixedly connected with the cover plates 97a, 168a. As a result of this rotation, the planet gears 83a are set in rotation and the ring gear 106a is set in rotation via the planet gears 83a. This is the same operation that was described with reference to FIGS. 1 to 4, with the difference that the driven-side damper element 88*a* serves as planetary carrier 95*a* in this case. This means that, proceeding from the drive, the branching off of a portion of the oscillating energy in the oscillating system comprising the planet gears 83*a* and ring gear 106*a* occurs only after the damping device 100*a*—on the driven side of the damping device 100*a*.

The following advantages result with respect to design as a result of the arrangement selected in FIG. 5. The springs 102 and the entire damping device 100*a* are shifted radially outward, so that the spring volume may be increased. To maintain an appropriate stiffness of the housing 10*a*, the lockup clutch 65*a* is shifted radially inward, especially within the radial area of the damping device 100*a*. Nevertheless, by utilizing a multi-plate clutch, a sufficient coupling torque may be made available. Due to the fact that the damping device 100*a* is now located on the radial outside, the individual planet gears 83*a* are arranged farther radially inward to utilize the radially inner installation space which is now free. The relocation of the planet gears 83*a* toward the radial inside has the advantage that the centrifugal forces acting on the planet gears during operation are smaller. Further, with regard to the axial support of the turbine, i.e., especially the turbine shell 29*a*, this has the result that the area of the foot 33*a* of the turbine shell 29*a*, especially in the area of the toothing 184*a*, may abut axially against the planetary carrier 95*a*. Further, the turbine shell 29*a* may be axially supported in the region of the foot 33*a* at the bearing journal 82*a* for the planet gears 83*a* or, if required, at the planet gears 83*a* themselves. A rubbing action at the optional sleeve 182*a* which is preferably made of soft material, e.g., brass, is also possible. The cover plate 97*a* may abut axially the other axial side of the planetary carrier 95*a* to prevent movement in the opposite axial direction for the turbine shell 29*a*. When friction facings or the like are provided in addition in these various areas which rub against one another when axial forces occur on the turbine shell 29*a*, this arrangement can be used in addition as a friction damping unit. It is noted that a dissipation of energy through generation of frictional heat is also carried out without providing special friction facings by the rubbing action of the various components against one another.

A possible preferred construction of the damping device 100*a* is described in the following with reference to FIG. 7. Because the damping device 100*a* is located in the radial outer area, it is possible, for example, to provide a damper spring arrangements 190*a* having two or three springs 102*a* in this damping device 100*a* (three springs 102*a* are shown in FIG. 7). Springs 102*a* which are directly adjacent to one another are supported at respective sliding blocks 196*a* in their end areas 192*a*, 194*a* which face one another. The two springs 102*a* which are situated in the circumferential direction at the end areas of the damper spring arrangement 190*a* are supported by their outer end areas (not shown in the Figures), for example, via respective spring plates 198*a* such as those depicted in FIG. 5 at the control edges 162*a*, 170*a*, 172*a* of the cover plates 97*a*, 168*a* and of the planetary carrier 95*a*. The sliding blocks 196*a* are guided radially outward at the axial portion 164*a* which connects the two cover plates 97*a*, 168*a* with one another and are freely movable corresponding to the compression of the springs 102*a* in the circumferential direction. In a construction of this type, it is possible to form the springs 102*a* which are associated with an individual damping spring arrangement 190*a*, for example, with different spring constants. Accordingly, it is possible for the middle spring 102*a* in FIG. 7 to have a smaller spring constant, while the two outer springs 102*a* have a greater spring constant— that it the two outer springs are stiffer than the middle. When torsional vibrations are introduced, the middle spring 102*a* is first compressed, while the outer springs 102*a* remain virtually unchanged. The two other springs 102*a* are also compressed only when a block protection is formed for the middle spring 102*a*, for example, in that the two sliding blocks 196*a* abut against one another, and this middle spring 102*a* cannot be compressed further. It is also possible to provide all of the springs with different spring constants to achieve an additional gradation. The springs may also comprise a plurality of springs of different diameters which are staggered radially one inside the other so that it is also possible in this case to provide the possibility of gradation.

The increasing length of the individual damper spring arrangements 190*a* in the circumferential direction increases the risk that, when compressed by the fluid flowing out of the area of the springs, the springs will be carried along in the axial direction. Therefore, the individual springs 102*a* must be secured against axial movement. In this respect, it will be seen from FIG. 5 that the turbine shell 29*a* directly adjoins the springs 102*a* at one axial side and therefore prevents excessive deflection of the springs 102*a* in this axial direction.

Spacer elements 198*a* which carry a retaining ring 200*a* are fastened to the cover plate 97*a* at the opposite axial side in the areas between two control edges 162*a*. The spacer elements 198*a* may be held in a press fit, for example, by a projection, in an associated recess in the cover plate 97*a*. The deflection of the springs 102*a* in the axial direction opposite to the turbine shell 29*a* is prevented by the retaining ring 200*a*.

In summary, it may be stated that the above-described embodiment forms of a torsional vibration damper in a hydrodynamic torque converter have the following essential and mutually independent features:

a) One of the input-side damper element and output-side damper element of the torsional vibration damper acts as a carrier for planet gears of a planetary gear set the other one of the input-side damper element and the output-side damper element comprises or forms a component controlling these gear unit elements. A branching off of a part of the oscillating energy in the planetary gear set is achieved in this way with the result that occurring torsional vibrations are filtered.

b) By relocating the damping device—i.e., the damping springs—toward a radial outer region, the spring volume may be increased making it possible to use a plurality of springs optionally having different spring constants, in a damper spring arrangement through the use of sliding blocks. A torsional damper acting in a graduated manner is achieved in this way.

c) The axial bearing of the turbine wheel or of the turbine shell is achieved simply by the turbine shell itself or by components acting in the area of the torsional damper arrangement, so that no additional structural component parts are required.

d) The axial securing of the springs of the damping device may be provided partly by the turbine shell and partly by separate securing elements.

e) When the damping device is located on the radial outside, the diameter of the lockup clutch may be reduced, especially when using a multi-plate clutch, such that the lockup clutch lies within an area radially inside of the damping device. In this way the stiffness of the converter housing is increased.

It is noted once again that the springs mentioned above and shown in the Figures need not be springs which are coiled in a helical or spiral manner, but can also be solid plastic blocks, for example, which are elastically deformable when acted upon by force.

The invention is not limited by the embodiments described above which are presented as examples only but can be modified in various ways within the scope of protection defined by the appended patent claims.

We claim:

1. In a combination comprising a torsional vibration damper with a lockup clutch in a hydrodynamic clutch device including an impeller wheel and a turbine wheel having a turbine shell and a turbine hub, said torsional vibration damper comprising:

a drive-side damper element connected with the turbine shell of the turbine wheel and rotatable about an axis of rotation;

a driven-side damper element connected with the turbine hub of the turbine wheel and rotatable about said axis of rotation, wherein said driven-side damper element and said turbine hub are rotatable relative to said drive-side damper element and said turbine wheel shell;

a damping device comprising at least one energy accumulator arranged circumferentially between said driven-side damper element and said drive-side element such that said drive-side element is rotatable relative to said driven side element against a circumferential force of said energy accumulator; and a planetary gear set comprising a carrier carrying at least a first gear unit element, said carrier being operatively connected with one of said drive-side damper element and said driven-side damper element, and a second gear unit element operatively connected with the other one of said drive-side element and said driven-side element.

2. The combination of claim 1, wherein said first gear unit element comprises a planet gear.

3. The combination of claim 2, wherein said second gear unit element is arranged radially inside of said planet gear and meshes in a tooth engagement with said planet gear so that said second gear unit element functions as a sun gear of said planetary gear set.

4. The combination of claim 2, wherein said second gear unit element is at least partially arranged radially inside of said first gear unit element and forms a sun gear of said planetary gear set.

5. The combination of claim 1, wherein said damping device comprises at least one damper spring arrangement extending substantially in the circumferential direction and having circumferential end areas arranged respectively with said drive-side damper element and said driven-side damper element, wherein said at least one damper spring arrangement is arrangable in a radial outer area of the clutch device.

6. The combination of claim 5, wherein said at least one damper spring arrangement comprises two damper springs and a supporting member arranged therebetween for supportably receiving ends of said two damper springs facing each other, said supporting members being displaceable in the circumferential direction with respect to said drive-side damper element and driven-side damper element, and the circumferential ends of said at least one damper spring arrangement are supported between said drive-side damper element and said driven-side damper element.

7. The combination of claim 5, wherein said torsional vibration damper further comprises an axial support arrangement for said at least one damper spring arrangement.

8. The combination of claim 7, wherein said axial support arrangement for said torsional vibration damper comprises one of said turbine shell of said hydrodynamic clutch device and an axial support ring.

9. The combination of claim 5, wherein said lockup clutch is operatively arranged with said drive-side damper element for selectively coupling said drive-side damper element with said clutch device for common rotation with the clutch device.

10. The combination of claim 9, wherein said lockup clutch comprises a multi-plate clutch arrangement.

11. The combination of claim 9, wherein said lockup clutch is arranged in an area radially inside said damping device of said torsional vibration damper.

12. The combination of claim 5, wherein said torsional vibration damper further comprises an axial supporting arrangement connected with said turbine wheel.

13. The combination of claim 12, wherein said axial supporting arrangement comprises said driven-side damper element.

14. The combination of claim 13, wherein said drive-side damper element of said torsional vibration damper is fixedly connected with said turbine shell of said hydrodynamic clutch device and said turbine shell and said drive-side damper element are axially supported at said driven-side damper element.

* * * * *